United States Patent [19]
Selgin

[11] 3,773,424
[45] Nov. 20, 1973

[54] DEVICE FOR COLOR MEASUREMENT OF LIQUIDS IN CONTINUOUS FLOW

[75] Inventor: Paul J. Selgin, Bethel, Conn.

[73] Assignee: Neotec Corporation, Rockville, Md.

[22] Filed: Aug. 24, 1972

[21] Appl. No.: 283,340

[52] U.S. Cl.................. 356/181, 250/218, 356/244, 356/246
[51] Int. Cl......................... G01j 3/50, G01n 21/26
[58] Field of Search..................... 356/181, 244, 246; 250/218

[56] References Cited
UNITED STATES PATENTS
2,690,695  10/1954  Coates................................ 356/246

*Primary Examiner*—Ronald L. Wibert
*Assistant Examiner*—F. L. Evans
*Attorney*—Morris Liss et al.

[57] ABSTRACT

A flow cell for a colorimeter contains a flat reflective surface in parallel spaced confronting relation to the flat surface of a viewing window. A fluid under test flows between the confronting surfaces where the fluid is subjected to incident light. Reflectance by the fluid determines colorimetric measurement. Standards for calibration can be inserted in the flow cell without stopping fluid flow.

8 Claims, 2 Drawing Figures

PATENTED NOV 20 1973

3,773,424

DEVICE FOR COLOR MEASUREMENT OF LIQUIDS IN CONTINUOUS FLOW

FIELD OF THE INVENTION

The present invention relates to flow cells and more particularly to such cells employed in instrumentation for on-line colorimetry measurements.

THE PRIOR ART

In recent years, there has been increased interest on the part of various industries to upgrade the uniformity of color of manufactured liquids. For example, it is highly desirable for a paint manufacturer to insure that a particular color remains indistinguishable as the paint is manufactured day by day. This allows the user to rely upon the uniformity of color in paint that was manufactured at different times. Similarly, color uniformity is greatly desired in industries such as cosmetics, dyes, synthetic fibers, food products, just to name a few.

The measurement of color as perceived by humans is a rather sophisticated art and science because the eye of a person filters light which is then processed in a particular manner by the brain. This is referred to as the psychological reaction of a human to color. Initial attempts at the measurement of color (colorimetry) included the use of narrow band pass filters to look for specific spectrum lines. Although these lines can be detected and measured, there must be further computation or processing to simulate the eye-brain response to color.

It has long been recognized, that basic colorimeter readings, such as obtained by narrow band pass filters, do not correspond directly to visual judgments, and many transformation equations have been proposed to convert these readings into visually uniform coordinates. In the last few years, a new instrument has been created which reads color-difference coordinates directly. The instrument was developed by the Engineering Physics Laboratory of E. I. duPont de Nemours and Company, Inc. An article covering this instrument in detail can be found in APPLIED OPTICS, Vol. 10, No. 4, April, 1971, at page 950.

Briefly, the duPont instrument is based on a cube-root system of color coordinates which reads color-difference coordinates directly. Silicon photovoltaic cells are used with glass filters to produce electrical signals proportional to tristimulus values. Tristimulus signals from a reference and a sample are converted to coordinate differences by means of solid state circuitry. This instrument is identified with the trademark DU-COLOR. U.S. Pat. No. 3,512,893 is directed to this instrument.

The present invention is basically a flow cell that permits a colorimeter, such as the DU-COLOR instrument to be used in measuring the color of liquids in a continuous flow.

BRIEF DESCRIPTION OF THE INVENTION

The present flow cell satisfies the following criteria:
1. It should not have to be detached for cleaning purposes.
2. It should be so constructed that the liquid flow past the viewing area is sufficiently fast to prevent settling or deposits of the liquid or of suspended particles on this area, or at the margins thereof, in order to reduce the frequency of cleaning to a minimum.
3. It should, if possible, lend itself to color measurement of all types of liquid (clear, translucent, opaque) for wider applicability and because in many cases opacity can vary widely at different points of a system or at the same point, depending on conditions and product variations. This is not a requirement in the case of liquids that are always clear, or always opaque; but it is desirable in all cases in the interest of standardization and uniformity.
4. Calibration of the instrument — comparison with a permanent standard — should be possible without disconnecting the insert or evacuating it, or interrupting the liquid flow in any manner. This should be a quick, easy operation and should permit the use of a number of different standards if different types of material are handled.

Prior art flow cells have not been able to meet the above listed characteristics. As a result, frequent cleaning of flow cells is required which necessitates terminating liquid flow. Next, in certain prior art flow cells the liquid flow must be terminated when calibration is performed. Because of the sensitivity of measurements in this type of instrument, recalibration is frequent. Accordingly, flow termination, because of calibration, poses a distinct disadvantage.

The present invention is a rugged, simply constructed flow-cell that includes components in a particular geometric relationship which reduces settling of deposits on the components. As a result, the frequency of cleaning is kept to a minimum.

The mechanical structure of the present invention is such that it remains open to liquid flow through a conduit during cleaning and maintenance of the instrument, thereby significantly reducing downtime.

The present invention allows measurements with clear, translucent, or opaque liquids. Therefore, the instrument permits a great deal of testing flexibility.

A most important aspect of the present invention regards the provision of slide-in calibration standards which makes calibration possible without interrupting the liquid flow.

DETAILED DISCUSSION OF THE INVENTION

The measurement of color applied to liquids in continuous flow does not differ from measurement of other materials in any substantial aspect. However, certain mechanical difficulties exist in the color measurement of liquids in continuous flow. The present invention is a solution of these difficulties and is not directed to the measurement per se. The present flow cell is adapted for use with color measuring instruments, such as the DU-COLOR instrument.

Figure 1:
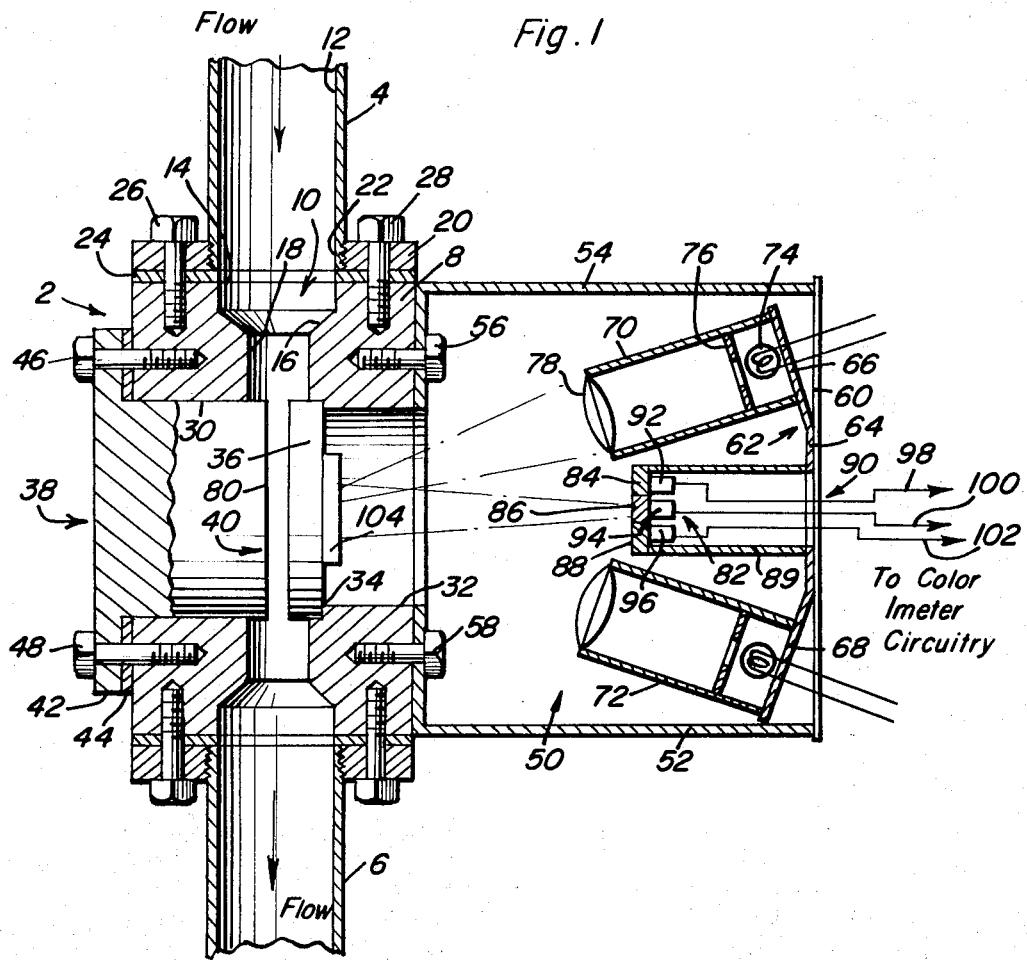
FIG. 1 illustrates a cross sectional view of the present flow cell.

Referring to the figures and more particularly FIG. 1, the invention will be seen in cross section. The main block 2 of the illustrated flow cell is seen to include passageways through which a continuous flow of material can pass. The main block has an inlet tube 4 connected to one end while an identical outlet tube 6 is connected at an axially opposite position. The tubes 4 and 6 can be of square or cylindrical internal cross section. The main block 2 has an upper solid portion 8 with an axially formed stepped-down bore generally indicated by reference numeral 10. This bore is in axial registry with the internal conduit 12 of the tube 4. Considering the bore in detail, the first section 14 has the same radius as the conduit portion 12. A conical step 16 is provided for smooth flow.

The conical step 16 then opens into an axial passageway 18 within the main block 2. The passageway 18 then communicates with the outlet tube 6.

An annular flange 20 is threadingly connected at 22 to the lower end of tube 4. An annular gasket 24 is positioned in interceding relationship between the flange 20 and the block portion 8. Threaded fasteners 26 and 28 secure the flange to the main body 2 thereby rigidifying the connection of the tube 4 to the main body 2.

The flow of material is from the inlet tube 4 to the outlet tube 6 via the centrally disposed axial passageway 18. Lateral to this direction is a larger bore 30 that extends into perpendicular communication with the axial passageway 18. In oppositely disposed registry with the bore 30 is a somewhat smaller bore 32 that steps up to the full diameter of lateral bore 30 at the recess indicated by reference numeral 34. This recess allows for the seating of a disc-shaped window 36. The window is cemented in place to assure permanent placement. A plug 38 slides into the enlarged bore 30 so that the inward end surface of the plug is maintained in parallel spaced relation to the confronting surface of window 36. Both of these surfaces are smoothly polished and highly machined to insure planar surfaces that are located equidistant from the axis of passageway 18. The confronting surface of plug 38 is finished with a white porcelain layer to ensure constant reflectivity.

By virtue of the parallel spaced relationship of the confronting surfaces of plug 38 and window 36, the flow of material from the inlet tube 4 has laminar character. The physical disposition of the confronting surfaces, as well as their smooth surface finishes results in little chance of particles adhering. Thus, these surfaces may be considered to be self-cleaning. The laminar flow through the passageway 18 is seen to occur through the narrow gap 40 that is defined between the confronting surfaces of plug 38 and window 36. The external headed portion 42 of the plug 38 functions as a flange that is heremetically sealed to the adjacent area of main block 2 by means of the annular gasket 44. Threaded fasteners 46 and 48 ensure sealing of the plug to the main block 2.

The photosensor portion of the invention is generally indicated by reference numeral 50. In detail, two L-shaped brackets 52 and 54 are secured by fasteners 56 and 58 to the side of main block 2. The brackets do not interfere with passage of light through the narrow lateral bore 32. A plate 60 connects the outer ends of the brackets 52 and 54. Of course, the brackets 52 and 54 can be replaced by a housing or enclosure.

The components of the photosensor section are mounted on a winged mounting plate generally indicated by 62. A central portion of the plate 62 is referenced by numeral 64 and is seen to be properly juxtaposed against the plate 60. Two angularly positioned winged sections 66 and 68 mount respective light sources 70 and 72 at 45° angles respective to the lateral axis through narrow bore 32. The lamp sources 70 and 72 are identical and include lamps that have a high, stable output throughout a relatively long life. Such a lamp may have a quartz envelope, iodine cycle, tungsten filament such as G.E. Type 6.6A/T2-1/2Q/CL-45. Lamp sources 70 and 72 each include a lens 78 in optical alignment with the lamp 74, itself.

The light rays for lamp source 70 are shown. A similar set of light rays are radiated by lamp source 72. However, for convenience, these will only be shown for the lamp source 70.

The following discussion relates to light travel when transparent liquid flows through the gap 40. Light from the lamp sources 70 and 72 are narrowed at aperture 76. The lens 78 projects an image of aperture 76 on window 36. The image falls entirely within the window 36 to get a true color reading which would not be possible without aperture 76. Light from the image passes through the window 36, then the gap 40, until the light is reflected from the white porcelain surface 80. This reflected light again passes through the liquid in gap 40, the window 36, for passage through a filter assembly 82 having three band pass filters 84, 86 and 88. These filters may be concentrically positioned with respect to each other. The purpose of the filters is to separate the reflected light by wavelength to obtain mean-ingful color measurements. The light is divided into three color ranges in the manner previously discussed in connection with the eye-brain interpretation of color.

The filter assembly 82 is mounted on a cylindrical support 89 while a three-part photosensor 90 is stationarily positioned directly behind the filter assembly 82, in axial relation thereto. The photosensor or detector assembly 90 is graphically illustrated as a single member. However, individual detectors can be used. The design criterion is that each detector 92, 94 and 96 of the assembly detects the light from a respective filter component 84, 86 and 88 of the filter assembly 82. As a result, an electrical signal is generated at the output of each detector 92, 94 and 96. The electrical leads associated with these detectors are indicated by reference numerals 98, 100 and 102. As indicated on the figure, these electrical leads are fed to colorimeter circuitry such as the du Pont DU-COLOR colorimeter. Each lead 98, 100 and 102 carries an electrical signal that represents a reflected color band resulting from the transmission of light through the liquid flowing in gap 40. These signals are then processed by the colorimeter circuitry to obtain a color reading.

Although the above text discussed utilization of the present invention with transparent liquids, an advantage of the present invention resides in its equal application to a liquid of translucent or opaque nature.

If the liquid is opaque, light from the lamp sources 70 and 72 shine through the window 36 for reflection at the interface between the window 36 and the liquid in gap 40. Light does not become reflected from the surface 80 of plug 38 because the opaque liquid either reflects or absorbs all of the light at the interface. The reflected light then passes through the window 36, and filter assembly 82 for final impingement on the photodetector assembly 90.

In the case of translucent liquids, a combination of reflected and transmitted color is measured. This is unavoidable and in fact, constitutes the only meaningful color measurement in such cases. One may replace the white porcelain finish of surface 80 with black or with a color approximately matching the liquid itself. This may be desirable in certain cases, depending upon conditions under which the liquid is actually seen in ordinary situations. However, ordinarily, the white backing is adequate since data obtained in this way has been found to correlate favorably with those resulting from the use of other backing colors.

As previously discussed, one of the greatest problems attendant to colorimeters is the problem of calibrating the instrument. With the present invention, calibration can be accomplished externally without disturbing the liquid flow through the passageway 18. For this purpose, a rectangular slot 104 is formed in the main body 2, adjacent the right side of window 36. The slot 104 permits the sliding entry of a color standard which reflects light to photosensor section 50.

Figure 2:
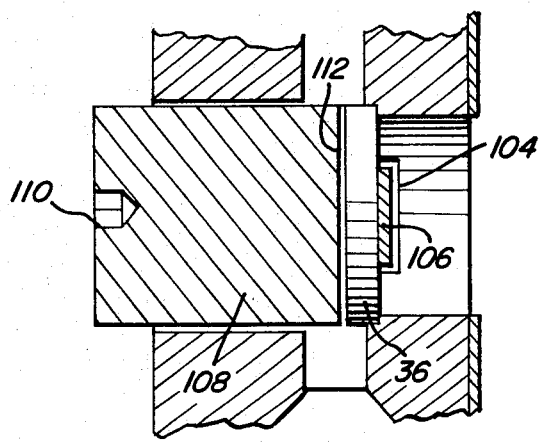
FIG. 2 is a partial cross sectional view illustrating the insertion of standards in the flow cell during the calibration procedure.

Calibration standards, which are conventional in colorimetry measurements, can be inserted as shown by 106, in FIG. 2. When so inserted, the light path from the lamp sources 70 and 72 are interrupted by the presence of the standard, which sends back to the detector assembly 90, light reflected from the standard surface which is unaffected by characteristics of the liquid or by conditions prevailing inside the window. Adjustments to the colorimeter circuits can be made so as to produce uniform and constant color readings when the external calibrating standard is inserted in the slot. This ensures correct readings of the liquid color after removal of the standard 106. Color values for the standard are customarily noted on the standard itself for easy reference.

Since the above-mentioned calibration standard occupies a geometric position somewhat different from the position of the liquid surface during measurement, in the event that absolute color values are required for the liquid itself, which is true only in the case of opaque liquids, a "primary" calibration is also necessitated in order to assign correct color values to the "secondary" calibration standard 106 of FIG. 2, which is inserted in slot 104. The "primary" calibration is resorted to only when a new "secondary" standard has to replace an old one due to wear, destruction or other reasons.

This "primary" calibration does require the interruption of flow through the flow cell. Pipes must be voided and the passages through the flow cell shown in FIG. 1 must also be voided. Then, as shown in FIG. 2, the "primary" calibration proceeds by removing the plug 38, and replacing it with a "primary" calibration plug 108, in lieu thereof. The plug 108 is longer than the usual reflecting plug 38 (FIG. 1), so that when it is inserted it comes into contact with window 36 as shown in FIG. 2.

Prior to inserting the plug 108 in its window contacting position, a standard laboratory procedure is followed to establish an "absolute" color measurement on the white ceramic surface 112 of the plug 108. Then, the "primary standard" plug 108 is inserted to contact window 36. Circuit adjustments are then made to reobtain these absolute values. Without readjustment, a new "secondary standard" 106 is inserted into slot 104 and readings are taken and noted on the secondary standard itself as future reference for subsequent calibrations.

According to the above discussion, it will be seen that the present invention is basically a flow cell which conveys liquid at some stage of its manufacture or packaging (bottling) for colorimetric measurement. The flow cell is conveniently mounted by detachable fittings to inlet and outlet tubes within a pipeline or duct. By virtue of the internal configuration of the invention, advantages can be gained from the present device that cannot be found in the prior art.

It should be understood that the invention is not limited to the exact details of construction shown and described herein for obvious modifications will occur to persons skilled in the art.

Wherefore the following is claimed:

1. A flow cell for effecting continuous on-line colorimetric measurement of fluids, the cell comprising:
   a main body for completing a communication path between fluid inlet and outlet means;
   a reflective surface positioned within the cell;
   a viewing window having a first side positioned in confronting relation to the reflective surface within the cell for restraining the fluid flow between the reflective surface and the window;
   a bore formed in the main body and positioned in registry with a second side of the window to permit the passage of light to the fluid through the bore and the viewing window; and
   a slot formed in the main body adjacent the second side of the window for allowing removable insertion of a secondary color standard therein to interrupt light passing toward the window and reflecting the light back through the bore for detection by external colorimetry circuits, whereby the reflected light is utilized by the circuits for color calibration without necessitating the termination of fluid flow through the cell or the removal of the cell from its operating position.

2. The structure set forth in claim 1 together with removable plug means having the reflective surface on the interior end thereof, the plug means being for sealing the interior of the flow cell, and when removed, permitting cleaning of the cell interior without detaching the inlet and outlet means from the flow path of the fluid.

3. The structure of claim 1 wherein the reflective surface and the confronting surface of the window are smoothly finished and positioned in parallel, close spaced relation to effect relatively rapid laminar flow of fluid therebetween, such flow resisting the deposit of material on the surfaces.

4. The structure as defined in claim 2 together with lamp means of relatively long life, the lamp means mounted outward of the bore for shining incident light through the bore and into the flow cell.

5. The structure as recited in claim 4 together with detector means mounted outward of the bore, the detector means responsive to light reflected from the flow cell for generating electrical signals representative of predetermined color content in the reflected light; and
   means for connecting the detector means to the external colorimeter circuits for quantitatively measuring the color content.

6. The structure of claim 5 together with a second removable plug for replacing the first mentioned plug during a primary calibration procedure, the second plug having a primary standard reflective surface thereon which is moved into contact with the confronting surface of the viewing window thus preventing the passage of fluid therebetween;
   the light reflected from the reflective surface of the second plug serving as a primary standard for calibrating the colorimeter circuits prior to using a new secondary standard.

7. The subject matter as defined in claim 2 wherein the inlet and outlet means lie along a first axial path through the main body of the flow cell, and further wherein a second perpendicular axis, serving as an optical axis, is defined through the main body, the second axis intersecting the reflective surface of the plug as well as the window and bore.

8. The subject as recited in claim 2 wherein the removable plug is hermetically sealed to the main body to prevent the leakage of fluid therefrom.

* * * * *